(12) United States Patent
Lovett et al.

(10) Patent No.: US 12,382,848 B2
(45) Date of Patent: Aug. 12, 2025

(54) PRESSURE TO HOLD OR RAISE THE HEAD FOR A WORK IMPLEMENT

(71) Applicant: Deere & Company, Moline, IL (US)

(72) Inventors: Benjamin M. Lovett, Ottumwa, IA (US); Austin M. Laugen, Davenport, IA (US); Conrado W. Scherer, Ottumwa, IA (US); Kevin M. Tacke, Oskaloosa, IA (US)

(73) Assignee: Deere & Company, Moline, IL (US)

( * ) Notice: Subject to any disclaimer, the term of this patent is extended or adjusted under 35 U.S.C. 154(b) by 256 days.

(21) Appl. No.: 18/359,451

(22) Filed: Jul. 26, 2023

(65) Prior Publication Data
US 2025/0031595 A1    Jan. 30, 2025

(51) Int. Cl.
 *A01B 61/02* (2006.01)
 *A01B 63/10* (2006.01)
 *A01B 63/108* (2006.01)

(52) U.S. Cl.
 CPC .......... *A01B 61/02* (2013.01); *A01B 63/1006* (2013.01); *A01B 63/108* (2013.01)

(58) Field of Classification Search
 CPC ... A01B 61/02; A01B 63/1006; A01B 63/108; A01B 63/008; A01B 63/22; B60W 2300/17; E02F 3/76; E02F 3/7609; E02F 3/7613; E02F 3/7636; E02F 3/764; E02F 3/422; E02F 3/3414; E02F 3/431; E02F 9/2004; E02F 9/2203; E02F 9/262; E02F 3/96; E02F 9/2292; E02F 9/2296; E02F 3/06; E02F 3/966; E02F 9/264; F04B 49/04; F04B 49/08; F04B 49/12; F04B 2201/0201; F04B 2201/0206; F04B 2201/00; F04B 35/004; F15B 2201/00; F15B 2215/00; F15B 19/00; F15B 21/087;
(Continued)

(56) References Cited

U.S. PATENT DOCUMENTS 4,625,690 A * 12/1986 Morita .................. F02P 5/1455
                                                123/399
4,773,379 A *  9/1988 Hashimoto ......... F02D 41/0077
                                               123/568.28
(Continued)

*Primary Examiner* — Fadey S. Jabr
*Assistant Examiner* — Faris Asim Shaikh
(74) *Attorney, Agent, or Firm* — Taft Stettinius & Hollister LLP; Stephen F. Rost

(57) ABSTRACT

An agricultural machine includes a controller disposed in communication with a work implement, an output, and an input. Left and right float cylinders are attached to and interconnected with a frame and left and right connecting arms. A desired operating condition from a plurality of predefined settings is then solicited from an operator via the input, wherein the desired operating condition corresponds to a designated pressure setting of the left and right float cylinders. The work implement is operated in a float mode of operation and then commanded to a raised position. The controller automatically determines a maximum pressure and a position that the maximum pressure corresponds to for the left and right float cylinders. The controller automatically modifies the designated pressure setting of the left and right float cylinders in the database based on the maximum pressure and position for each of the left and right float cylinders.

20 Claims, 9 Drawing Sheets

(58) Field of Classification Search
CPC ...... F15B 2211/6313; F15B 2211/6653; F15B 2211/76
See application file for complete search history.

(56) References Cited

U.S. PATENT DOCUMENTS

| | | | |
|---|---|---|---|
| 5,607,209 A * | 3/1997 | Narita | B60T 8/3275 303/15 |
| 9,097,247 B1 * | 8/2015 | Cushing | F04B 49/065 |
| 10,349,571 B2 * | 7/2019 | Fink | A01B 63/32 |
| 2006/0246834 A1 * | 11/2006 | Masumoto | B60H 1/00378 454/109 |
| 2007/0095059 A1 * | 5/2007 | VerKuilen | E02F 9/2296 60/468 |
| 2017/0108882 A1 * | 4/2017 | Dissing | F04B 49/065 |
| 2019/0230857 A1 * | 8/2019 | Thomson | A01D 41/141 |
| 2022/0061218 A1 * | 3/2022 | Karst | A01B 63/10 |
| 2022/0117143 A1 * | 4/2022 | Kraus | A01D 41/141 |
| 2024/0391286 A1 * | 11/2024 | Anderson | H02K 7/14 |
| 2024/0409375 A1 * | 12/2024 | Pfetsch | B66C 13/54 |

* cited by examiner

PRESSURE TO HOLD OR RAISE THE HEAD FOR A WORK IMPLEMENT

FIELD OF THE DISCLOSURE

The disclosure generally relates to an agricultural machine configured to support an attachable work implement, and a method of controlling the work implement.

BACKGROUND OF THE DISCLOSURE

Some agricultural machines are configured to receive or connect to an attachable work implement. The work implement may include, but is not limited to, a crop harvesting head for harvesting crop material, or a cutter head for cutting standing crop material. Such agricultural machines may be configured to operate with several different styles and/or sizes of work implements. Each different size and/or style of work implement may have different recommended operating settings for a implement linkage system connecting the work implement to the agricultural vehicle.

The agricultural machine and the attached work implement may be configured to cut different crop materials. The crop materials may include, but are not limited to, forages and grains. Because the crop materials have different characteristics, the implement linkage system and work implements may have to be positioned differently for different crop materials, or different work implements may have to be used for different crop materials.

As noted above, the work implement may include a cutter head for cutting standing crop materials. Two commonly used styles of cutter heads include rotary style cutter heads, which are often used for cutting forage crops, and draper style cutter heads which are often used for cutting grain crops. Each of the rotary style cutter heads and the draper style cutter heads May additionally come in different sizes. Because the draper style cutter heads are often used to cut grain crops, which are often close to a ground surface, the implement linkage system may be operated in a float operating condition that allows the cutter head to vertically track the ground surface during horizontal movement over the ground surface. The rotary style cutter heads are often used to cut forage crops, which are formed into a windrow.

It is useful for the operator of the agricultural machine to set a float pressure of one or more lift cylinders of the work implement for a specified float operating condition over a field. Over time, the configurations or tolerances of the work implement and the agricultural machine change. Additionally, the field conditions and crops change from year to year over the same field which also affects the float operating settings and condition of the one or more lift cylinders. Occasionally the work implements are changed for the agricultural machine wherein each work implement will have its own preferred float operating setting and condition. The operating settings for each respective or different work implement are dependent upon the specific weight, size, length, etc. of that specific work implement. The one or more lift cylinders may have different float operating setting to account for each side of a specific work implement. Moreover, operators who often cut standing crop are less skilled than operators for other types of equipment and may find the adjustment of the float operating settings challenging. Improper adjustment of the float operating settings can lead to damage of the work implement during use of the work implement.

Thus there is a need for improvement for adjustment of performance parameters for a lift and float system of a work implement for an agricultural machine.

SUMMARY

According to one embodiment of the present disclosure, an agricultural machine comprising: a frame; an implement linkage system attached to the frame and configured for attaching a selected work implement from a plurality of different work implements to the frame, wherein the implement linkage system includes a left connecting arm and a right connecting arm; a left float cylinder attached to and interconnected with the frame and the left connecting arm; a right float cylinder attached to and interconnected with the frame and the right connecting arm; wherein the implement linkage system is controllable in a float operating condition allowing the selected work implement to vertically track a ground surface during horizontal movement over the ground surface; an output operable to convey a message to an operator; an input operable to receive instructions from the operator; a controller including a processor and a memory having a float control algorithm stored thereon, wherein the processor is operable to execute the float control algorithm to: identify the selected work implement from the plurality of different work implements; solicit a desired operating condition from a plurality of predefined settings from the operator via the input, wherein the desired operating condition corresponds to a designated pressure setting of the left and right float cylinders in a database; operate the work implement in a float mode of operation; command the work implement to a raised position; automatically determine a maximum pressure and a position that the maximum pressure corresponds to for each of the left and right float cylinders; and automatically modify the designated pressure setting of the left and right float cylinders in the database based on the maximum pressure and position for each of the left and right float cylinders.

In one example, wherein the processor is operable to execute the float control algorithm to automatically determine if the maximum pressure is within an acceptable tolerance for each of the left and right float cylinders.

In another example, wherein when the maximum pressure is within the acceptable tolerance for each of the left and right float cylinders then the designated pressure setting of the left and right float cylinders in the database is not changed.

In yet another example, wherein when the maximum pressure is within the acceptable tolerance for one of the left and right float cylinders then the designated pressure setting of that one of left and right float cylinders in the database is not changed, and wherein when the maximum pressure is not within the acceptable tolerance for the other of the left and right float cylinders then the designated pressure setting of the other of the left and right float cylinders in the database is modified.

In yet another example, wherein modification of the designated pressure setting in the database includes averaging corresponding pressure values of the predefined settings with the maximum pressure for the other of the left and right float cylinders to determine a plurality of corrected pressures required to raise the work implement.

In another example, wherein the processor is operable to execute the float control algorithm to automatically replace the designated pressure settings of the other of left and right float cylinders with the plurality of corrected pressures required to raise the work implement in the database.

In yet another example, wherein when the maximum pressure is not within the acceptable tolerance for the left and right float cylinders then the designated pressure setting of the left and right float cylinders in the database is modified.

In another example, wherein modification of the designated pressure setting in the database includes averaging corresponding pressure values of the predefined settings with the maximum pressure for the left and right float cylinders to determine a plurality of corrected pressures required to raise the work implement.

In another example, wherein the processor is operable to execute the float control algorithm to automatically replace the designated pressure settings of the left and right float cylinders with the plurality of corrected pressures required to raise the work implement in the database.

In another example, wherein the automatically determine a maximum pressure and a position that the maximum pressure corresponds to for each of the left and right float cylinders occurs while the work implement is moving to the raised position.

In another example, wherein the automatically determine a maximum pressure and a position that the maximum pressure corresponds to for each of the left and right float cylinders occurs after the work implement has moved to the raised position.

According to another embodiment of the present disclosure, a method of controlling an agricultural machine, the method comprising: providing an agricultural machine having a frame, an implement linkage system attached to the frame and configured for attaching a selected work implement from a plurality of different work implements to the frame, wherein the implement linkage system includes a left connecting arm and a right connecting arm, a left float cylinder attached to and interconnected with the frame and the left connecting arm, a right float cylinder attached to and interconnected with the frame and the right connecting arm, wherein the implement linkage system is controllable in a float operating condition allowing the selected work implement to vertically track a ground surface during horizontal movement over the ground surface, a controller including a processor and a memory having a float control algorithm 6 stored thereon; identifying via the controller the selected work implement from the plurality of different work implements; soliciting a desired operating condition from a plurality of predefined settings from the operator via an input operable to receive instructions from the operator, wherein the desired operating condition corresponds to a designated pressure setting of the left and right float cylinders in a database; operating the work implement in a float mode of operation; commanding the work implement to a raised position; automatically determining via the controller a maximum pressure and a position that the maximum pressure corresponds to for each of the left and right float cylinders; and automatically modifying, via the controller, the designated pressure setting of the left and right float cylinders in the database based on the maximum pressure and position for each of the left and right float cylinders.

In one example, further comprising: automatically determining if the maximum pressure is within an acceptable tolerance for each of the left and right float cylinders, wherein when the maximum pressure is within the acceptable tolerance for any of the left and right float cylinders then the designated pressure setting of the corresponding float cylinder in the database is not changed, and wherein when the maximum pressure is not within the acceptable tolerance for any of the left and right float cylinders then the designated pressure setting of the corresponding right float cylinder in the database is modified.

In another example, wherein modifying the designated pressure setting in the database includes averaging corresponding pressure values of the predefined settings with the maximum pressure for the left and right float cylinders to determine a plurality of corrected pressures required to raise the work implement.

In another example, further comprising: automatically replacing the designated pressure settings of the left and right float cylinders with the plurality of corrected pressures required to raise the work implement in the database.

In another example, wherein when the maximum pressure is not within the acceptable tolerance for the left and right float cylinders then the designated pressure setting of the left and right float cylinders in the database is modified.

In another example, wherein modifying the designated pressure setting in the database includes averaging corresponding pressure values of the predefined settings with the maximum pressure for the left and right float cylinders to determine a plurality of corrected pressures required to raise the work implement.

In another example, further comprising: automatically replacing the designated pressure settings of the left and right float cylinders with the plurality of corrected pressures required to raise the work implement in the database.

In yet another example, wherein the automatically determining a maximum pressure and a position that the maximum pressure corresponds to for each of the left and right float cylinders occurs while the work implement is moving to the raised position.

In yet another example, wherein the automatically determining a maximum pressure and a position that the maximum pressure corresponds to for each of the left and right float cylinders occurs after the work implement has moved to the raised position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 2:
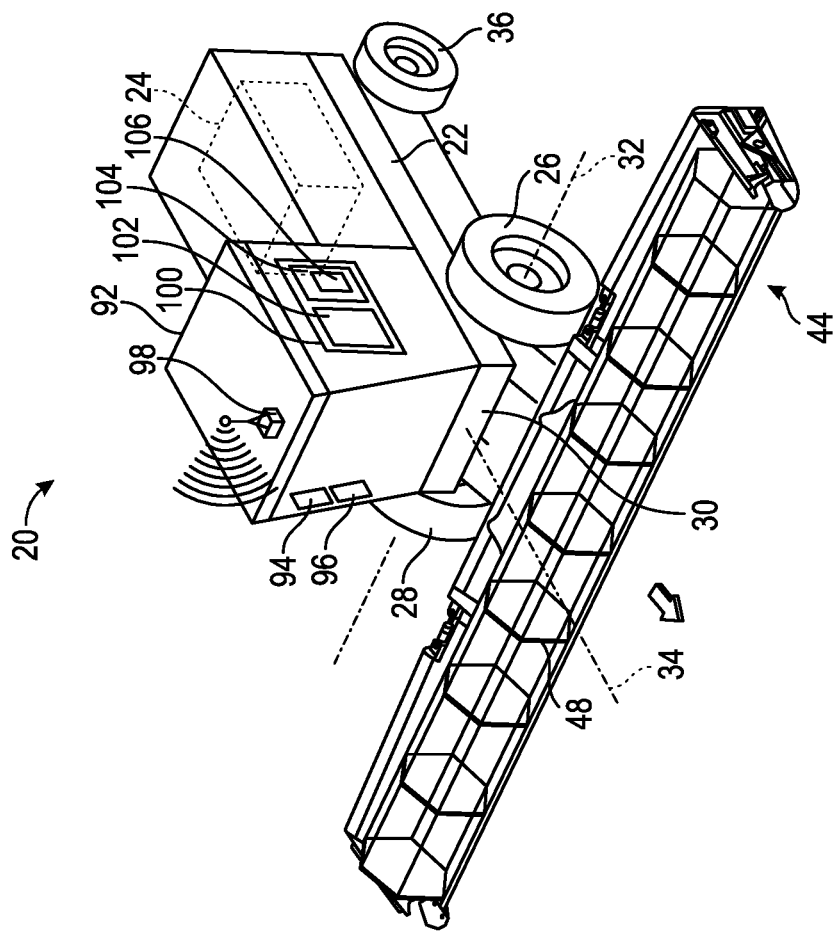
FIG. 2 is a schematic perspective view of the agricultural machine with a draper cutter head attached.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Some of the benefits of the present disclosure include a unique technique to hold, adjust, and/or raise a head or float pressure for each of right and left float cylinders of a work implement attached to an agricultural machine. The user interface or input includes a selection of pressures relevant to operation of a specific work implement that is mounted on the agricultural vehicle. The present disclosure simplifies the user interface or input of the agricultural machine to allow the user or operator to set a float pressure of each of right and left float cylinders or both of these cylinders by selecting from the user interface one of a plurality of desired header down forces that corresponds to a plurality of float pressures stored in a lookup table for the specific work implement. In one embodiment, a plurality of header down force selections include very light, light, typical, heavy, and very heavy are displayed on the user interface for the operator to select. These header down force selections are exemplary and fewer or more of these selections are contemplated by this disclosure as well as other types of selections that are displayed on the user interface. The description of each of the header down force selection may change as desired.

The adjustment of the corresponding selected header down force or nominal header down force for each of the right and left float cylinders is desired over time as the agricultural machine and work implement age or are used in the field and thus change due to operating conditions. The agricultural machine and work implement will have variances over time that will influence a target float pressure for each of these right and left float cylinders which affect the actual amount of header down force that is applied to a ground surface. For example, the work implement May be modified from its original manufactured state to include additional attachments that increase the mass and weight of the work implement. Or the work implement may be modified to remove elements of the work implement that decrease the mass and weight of the work implement. Over time, the function of pivots of the work implement also change. Some examples of pivots include lift arms or connecting arms that include a bushing, a seal, grease fittings, roller bearings, etc. that may fail or become lodged with soil at these locations. While the work implement is being raised, due to these failures or changes in the pivots, the amount of load or force required to raise the work implement changes and the present disclosure determines how to account for these variances. The present disclosure identifies variances from nominal amount of header down force and adjusts the target float pressure of the right and left float cylinders to provide a consistent amount of header down force for the right and left float cylinders and thereby a consistent performance of the work implement.

Figure 1:
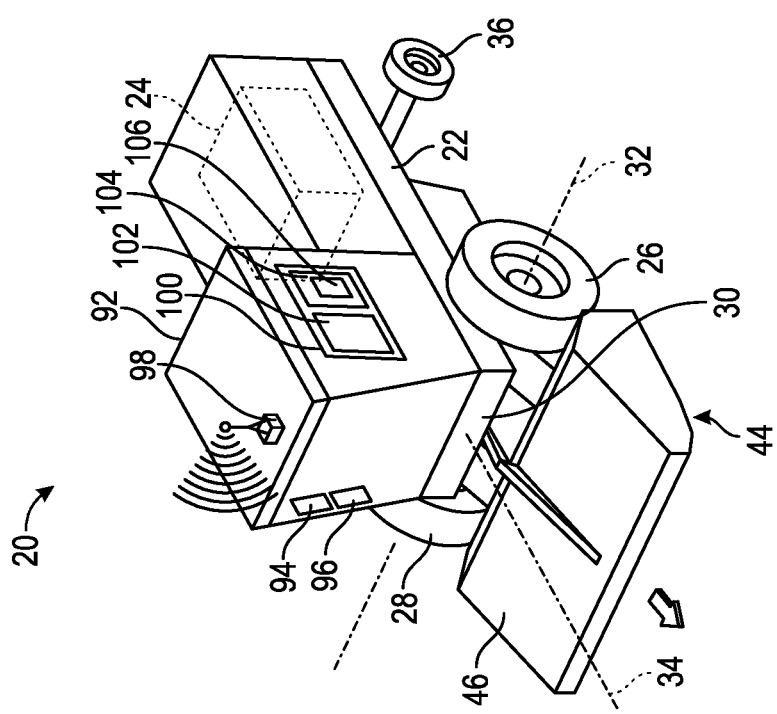
FIG. 1 is a schematic perspective view of an agricultural machine with a rotary cutter head attached.

Referring to the Figures, wherein like numerals indicate like parts throughout the several views, an agricultural machine is generally shown at 20 in FIGS. 1 and 2. The example embodiment of the agricultural machine 20 shown in FIGS. 1 and 2 includes, but is not limited to, a self-propelled windrower. However, it should be appreciated that the teachings of this disclosure may be applied to machines other than the example windrower depicted in FIGS. 1 and 2.

Referring to FIGS. 1 and 2, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Referring to FIGS. 1 and 2, the agricultural machine 20 further includes a left rear caster wheel 36 and a right rear caster wheel (not shown) attached to the frame 22. As used herein, the term "caster wheel" should be understood to include a wheel that is able to rotate a full three hundred sixty degrees (360°) about a respective generally vertical axis. As such, each of the left rear caster wheel 36 and the right rear caster wheel are rotatable a full three hundred sixty degrees (360°) about a respective generally vertical axis. The left rear caster wheel 36 and the right rear caster wheel may be attached to the frame 22 in a suitable manner. The specific manner in which the left rear caster wheel 36 and the right rear caster wheel are attached to the frame 22 is not pertinent to the teachings of this disclosure, are understood by those skilled in the art, and are therefore not described in detail herein.

Figure 3:
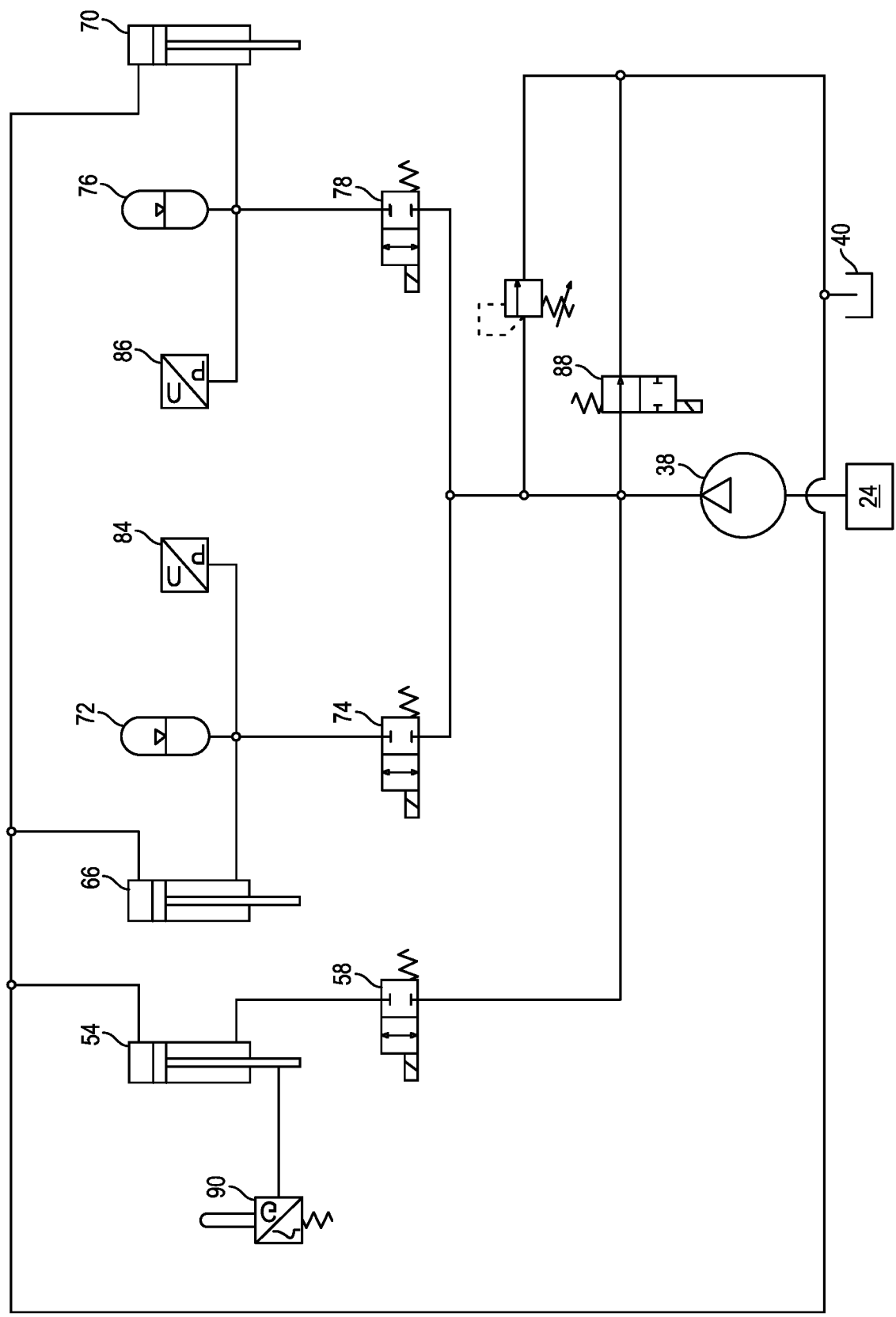
FIG. 3 is a schematic diagram of a first embodiment of a hydraulic system of the agricultural machine.

Referring to FIG. 3, the agricultural machine 20 includes a first embodiment of a hydraulic system. The hydraulic system includes a pressure source 38 configured to supply a flow of pressurized fluid. The pressure source 38 may include, but is not limited to, an auxiliary fluid pump that is drivenly coupled to the prime mover 24. The pressure source 38 draws fluid from a tank 40, and circulates the fluid through the hydraulic system. The tank 40 receives the fluid from the hydraulic system, stores the fluid, and supplies the fluid to the pressure source 38, e.g., the auxiliary fluid pump. Fluid flow and/or pressure may be used to operate various components of the agricultural machine 20, as described in greater detail below.

Figure 4:
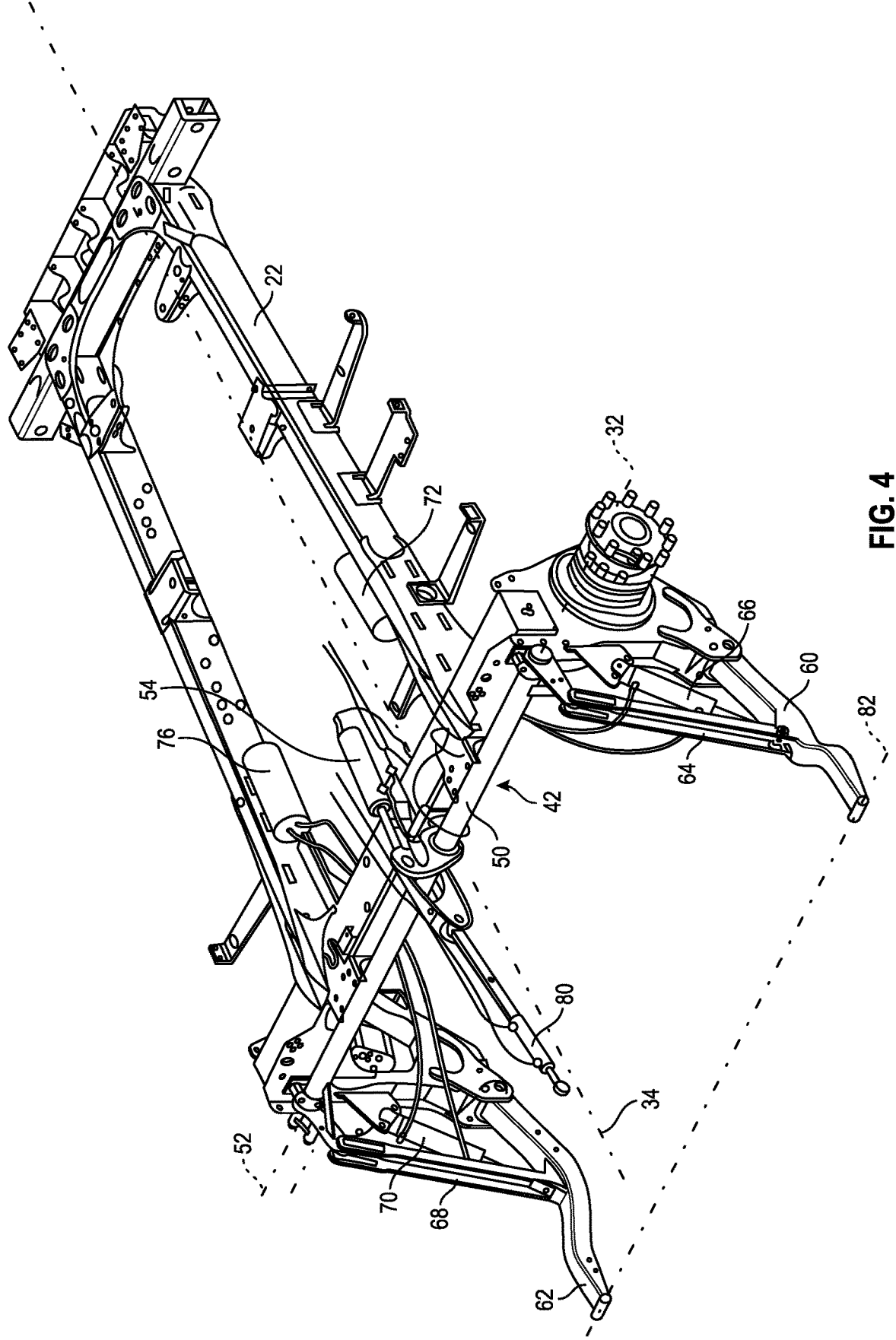
FIG. 4 is a schematic perspective view of a frame and a implement linkage system of the agricultural machine.

Referring to FIG. 4, the agricultural machine 20 includes a first embodiment of an implement linkage system 42 attached to the frame 22. In the implementation shown in the Figures and described herein, the implement linkage system 42 is attached to the frame 22 adjacent the forward end 30 of the frame 22. The implement linkage system 42 is configured for attaching a selected work implement 44 from a plurality of different work implements to the frame 22. In the example implementation shown in the Figures and described herein, the plurality of different work implements may include a rotary cutter 46 such as shown in FIG. 1, or a draper cutter 48 such as shown in FIG. 2. It should be appreciated that the plurality of different work implements may further include different sizes of each of the rotary cutter 46 and the draper cutter 48. Additionally, it should be appreciated that the work implements may include devices other than the example draper cutter 48 and the example rotary cutter 46, and that the agricultural machine 20 is not limited to the self-propelled windrower shown in the figures and desired herein.

Referring to FIGS. 3 and 4, the implement linkage system 42 includes a rockshaft 50 rotatably mounted to the frame 22 for rotational movement about a shaft axis 52 that extends transverse to the longitudinal axis 34 of the frame 22. A lift cylinder 54 is attached to and interconnects the rockshaft 50 and the frame 22. The lift cylinder 54 is operable to rotate the rockshaft 50 about the shaft axis 52 in order to raise and lower the selected work implement 44 relative to a ground surface. As such, the lift cylinder 54 is operated to control a vertical height of the selected work implement 44 above the ground surface. In the example implementation described herein, the lift cylinder 54 is a single acting hydraulic cylinder disposed in fluid communication with the hydraulic system. A lift control valve 58 controls fluid communication between the lift cylinder 54 and the pressure source 38. In other embodiments, the lift cylinder 54 may include a double acting hydraulic cylinder, an electrically actuated linear actuator, or some other device capable of extending and retracting. The lift cylinder 54 extends in response to fluid pressure and/or flow from the hydraulic system in the usual manner, and is retracted by gravitational forces acting on the implement linkage system 42 and/or the selected work implement 44 attached to the implement linkage system 42 as understood by those skilled in the art.

The implement linkage system 42 further includes a left connecting arm 60 and a right connecting arm 62. The left connecting arm 60 is rotatably attached to the frame 22 below the rockshaft 50, on a left side of the frame 22. A left linkage 64 is attached to and interconnects the left connecting arm 60 and the rockshaft 50. A left float cylinder 66 is attached to and interconnects the frame 22 and the left linkage 64. A respective forward end 30 of the left float cylinder 66 is attached to the left linkage 64. The left float cylinder 66 extends rearward and vertically upward to a respective rearward end of the left float cylinder 66, which is attached to the frame 22. The right connecting arm 62 is rotatably attached to the frame 22 below the rockshaft 50, on a right side of the frame 22. A right linkage 68 is attached to and interconnects the right connecting arm 62 and the rockshaft 50. A right float cylinder 70 is attached to and interconnects the frame 22 and the right linkage 68. A respective forward end 30 of the right float cylinder 70 is attached to the right linkage 68. The right float cylinder 70 extends rearward and vertically upward to a respective rearward end of the right float cylinder 70, which is attached to the frame 22.

The left float cylinder 66 is disposed in fluid communication with a left accumulator 72. The left float cylinder 66 and the left accumulator 72 cooperate to form a volume. Fluid pressure within the volume defined by the left float cylinder 66 and the left accumulator 72 may be controlled to provide a resistance against retraction or compression of the left float cylinder 66. A left float control valve 74 controls fluid communication between the left float cylinder 66 and the pressure source 38. The right float cylinder 70 is disposed in fluid communication with a right accumulator 76. The right float cylinder 70 and the right accumulator 76 cooperate to form a volume. Fluid pressure within the volume defined by the right float cylinder 70 and the right accumulator 76 may be controlled to provide a resistance against retraction or compression of the right float cylinder 70. A right float control valve 78 controls fluid communication between the right float cylinder 70 and the pressure source 38. The left float cylinder 66 and the right float cylinder 70 are each operable to provide a bias or resistance force against upward movement of the left connecting arm 60 and the right connecting arm 62 respectively.

In the example implementation described herein, the left float cylinder 66 and the right float cylinder 70 are each single acting hydraulic cylinders disposed in fluid communication with the hydraulic system. In other embodiments, the left float cylinder 66 and the right float cylinder 70 may include a double acting hydraulic cylinder, an air cushion or spring device, or some other device capable of biasing the left connecting arm 60 and the right connecting rod downward toward the ground surface.

The implement linkage system 42 may further include a tilt cylinder 80. The tilt cylinder 80 is attached to and interconnects the frame 22 and the selected work implement 44 attached to the implement linkage system 42. The tilt cylinder 80 is operable to rotate the selected work implement 44 attached to the implement linkage system 42 relative the ground surface. More specifically, the tilt cylinder 80 rotates the selected work implement 44 about a tilt axis 82, which extends transverse to the longitudinal axis 34 of the frame 22 and through distal ends of the left connecting arm 60 and the right connecting arm 62. In the example implementation described herein, the tilt cylinder 80 is a double acting hydraulic cylinder disposed in fluid communication with the hydraulic system. In other embodiments, the tilt cylinder 80 may include a single acting hydraulic cylinder, an electrically actuated linear actuator, or some other device capable of extending and retracting. The tilt cylinder 80 extends and retracts in response to fluid pressure and/or flow from the hydraulic system in the usual manner as understood by those skilled in the art.

The implement linkage system 42 is controllable between a float operating condition and a fixed height operating condition. When configured for the float operating condition, the implement linkage system 42 allows the selected work implement 44 to vertically track the ground surface during horizontal movement of the agricultural machine 20 over the ground surface. When configured for the float operating condition, the lift control valve 58 is closed to block fluid communication between the pressure source 38 and the lift cylinder 54. A return valve 88 may be opened to allow fluid communication between the lift cylinder 54 and the tank 40, which allows the lift cylinder 54 to extend and retract freely. Additionally, when the implement linkage system 42 is configured for the float operating condition, a desired amount of fluid pressure is supplied to the left float cylinder 66 and the right float cylinder 70 to provide a desired amount of resistance against upward vertical movement, thereby keeping the selected work implement 44 in contact with the ground surface while allowing the selected work implement 44 to track the ground surface. A left pressure sensor 84 may be included to sense and monitor the fluid pressure applied to the left float cylinder 66. Similarly, a right pressure sensor 86 may be included to sense and monitor the fluid pressure applied to the right float cylinder 70.

The fixed height operating condition fixes a position of the selected work implement 44 relative to the frame 22 during horizontal movement of the agricultural machine 20 over the ground surface. When the implement linkage system 42 is configured in the fixed height operating condition, the return valve 88 is closed, and the lift control valve 58 is opened to allow fluid communication between the pressure source 38 and the lift cylinder 54 to extend the lift cylinder 54 to a desired position and position the selected work implement 44 at a desired height above the ground surface, after which the lift control valve 58 is closed to block fluid communication between the pressure source 38 and the lift cylinder 54 to secure the lift cylinder in the desired position. A position sensor 90 may be positioned to sense a position of the lift cylinder 54 and/or a position of the selected work implement 44 to determine the position of the selected work implement 44 relative to the ground surface. Once the position of the lift cylinder 54 is set, the return valve 88 may be opened so that fluid flow from the pressure source 38 is directed to the tank 40.

Figure 5:
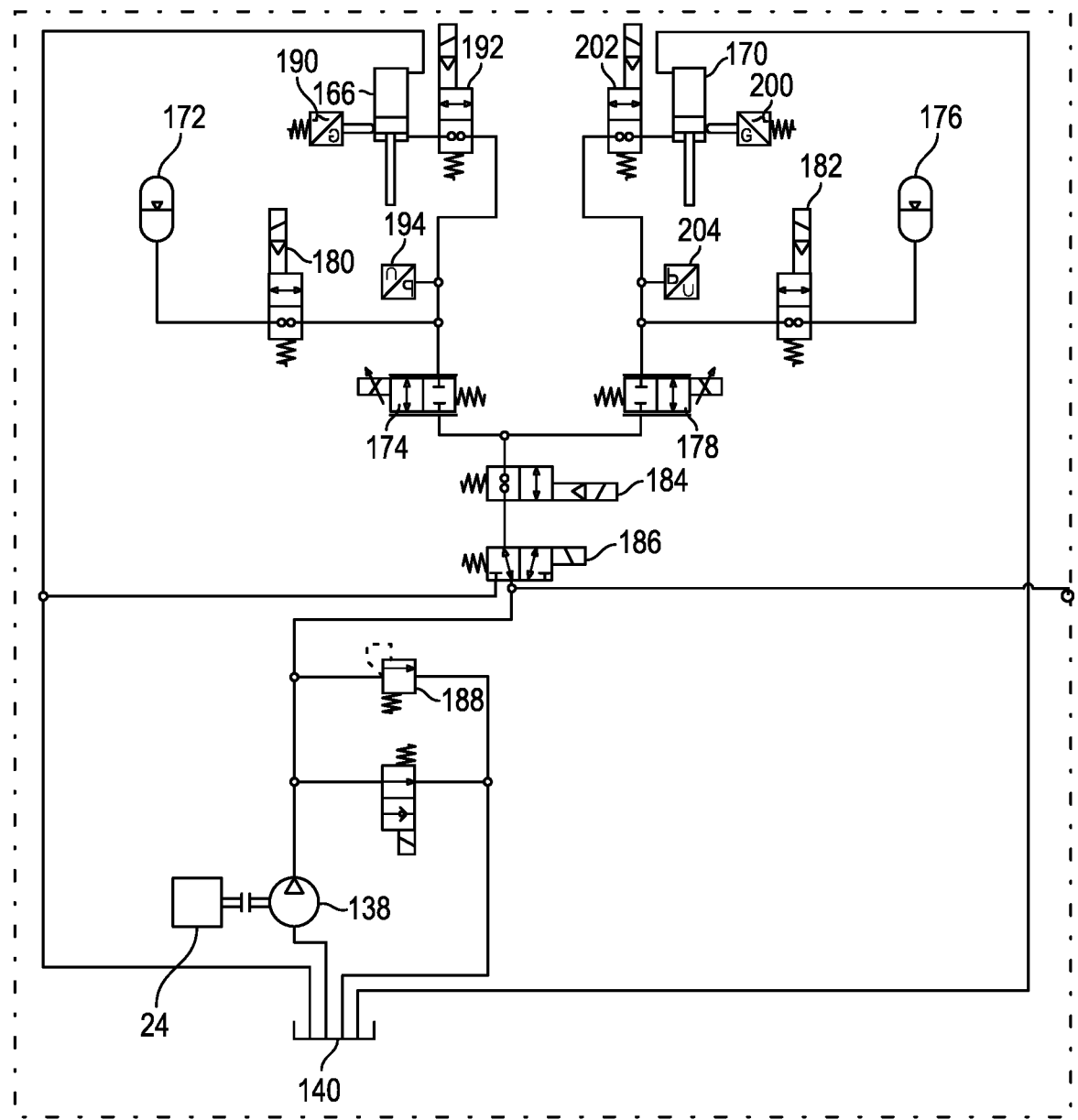
FIG. 5 is a schematic diagram of a second embodiment of a hydraulic system of the agricultural machine.

Referring to FIG. 5, the agricultural machine 20 includes a second embodiment of a hydraulic system. The hydraulic system illustrated in FIG. 5 is similar to the hydraulic system illustrated in FIG. 3 wherein both hydraulic systems are exemplary embodiments that can be used with the present application. The hydraulic system includes a pressure source 138 configured to supply a flow of pressurized fluid. The pressure source 138 may include, but is not limited to, an auxiliary fluid pump that is drivenly coupled to the prime mover 24. The pressure source 138 draws fluid from a tank 140, and circulates the fluid through the hydraulic system. The tank 140 receives the fluid from the hydraulic system, stores the fluid, and supplies the fluid to the pressure source 138, e.g., the auxiliary fluid pump. Fluid flow and/or pressure may be used to operate various components of the agricultural machine 20, as described in greater detail below. The pressure source 138 is also connected to an open center valve 188 which is operatively connected to a raise/lower valve 186 and a pressure holding valve 184 that is configured to vent left and right accumulators 172 and 176 in case of a pressure failure.

Figure 6:
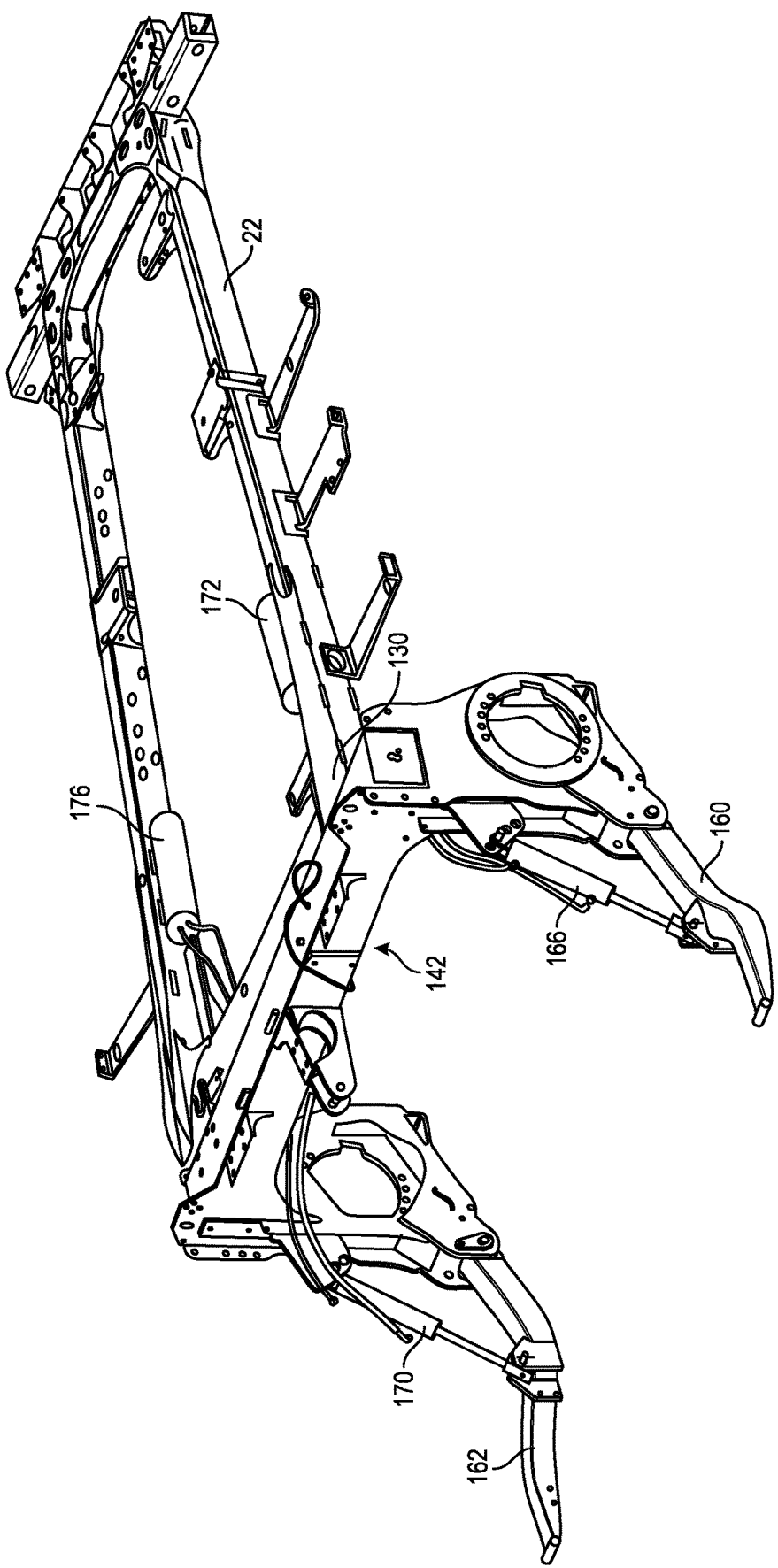
FIG. 6 is a schematic perspective view of a frame and a implement hydraulic system of the agricultural machine.

Referring to FIG. 6, the agricultural machine 20 includes an implement linkage system 142 attached to a frame 122. The frame 122 illustrated in FIG. 6 is similar to the frame 22 illustrated in FIG. 4 and therefore will not be described again. The frames 22 and 122 are exemplary embodiments that can be used with the present application. In the implementation shown in the Figures and described herein, the implement linkage system 142 is attached to the frame 122 adjacent a forward end 130 of the frame 122. The implement linkage system 142 is configured for attaching the selected work implement 44 from a plurality of different work implements to the frame 122. In the example implementation shown in the Figures and described herein, the plurality of different work implements may include the rotary cutter 46 such as shown in FIG. 1, or the draper cutter 48 such as shown in FIG. 2. It should be appreciated that the plurality of different work implements may further include different sizes of each of the rotary cutter 46 and the draper cutter 48. Additionally, it should be appreciated that the work implements may include devices other than the example draper cutter 48 and the example rotary cutter 46, and that the agricultural machine 20 is not limited to the self-propelled windrower shown in the figures and desired herein.

Referring to FIGS. 5 and 6, the implement linkage system 142 further includes a left connecting arm 160 and a right connecting arm 162. The left connecting arm 160 is rotatably attached to the frame 122, on a left side of the frame 122. A left float cylinder 166 is attached to and interconnects the frame 122 and the left connecting arm 160. A respective forward end of the left float cylinder 166 is attached to the left connecting arm 160. The left float cylinder 166 extends rearward and vertically upward to a respective rearward end of the left float cylinder 166, which is attached to the frame 122. The right connecting arm 162 is attached to the frame 122, on a right side of the frame 122. A right float cylinder 170 is attached to and interconnects the frame 122 and the right connecting arm 162. A respective forward end of the right float cylinder 170 is attached to the right connecting arm 162. The right float cylinder 170 extends rearward and vertically upward to a respective rearward end of the right float cylinder 170, which is attached to the frame 122.

The left float cylinder 166 is disposed in fluid communication with a left accumulator 172. The left float cylinder 166 and the left accumulator 172 cooperate to form a volume. Fluid pressure within the volume defined by the left float cylinder 166 and the left accumulator 172 may be controlled to provide a resistance against retraction or compression of the left float cylinder 166. A left float control valve 174 controls fluid communication between the left float cylinder 166 and the pressure source 138. A left accumulator lockout valve 180 is in fluid communication with the left float control valve 174 and the left accumulator 172 to expel any pressurized compressed air in the lines such as for maintenance and/or emergency situations. The left float cylinder 166 is disposed in communication with a left cylinder position sensor 190 to determine a position of the left float cylinder 166. The left float cylinder 166 is disposed in communication with a left cylinder lockout valve 192 to prevent access to the left float cylinder 166. The left float cylinder 166 is operatively coupled to a left float pressure transducer 194 that transforms pressure into an analog electrical signal.

The right float cylinder 170 is disposed in fluid communication with a right accumulator 176. The right float cylinder 170 and the right accumulator 176 cooperate to form a volume. Fluid pressure within the volume defined by the right float cylinder 170 and the right accumulator 176 may be controlled to provide a resistance against retraction or compression of the right float cylinder 170. A right float control valve 178 controls fluid communication between the right float cylinder 170 and the pressure source 138. A right accumulator lockout valve 182 is in fluid communication with the right float control valve 178 and the right accumulator 176 to expel any pressurized compressed air in the lines such as for maintenance and/or emergency situations. The right float cylinder 170 is disposed in communication with a right cylinder position sensor 200 to determine a position of the right float cylinder 170. The right float cylinder 170 is disposed in communication with a right cylinder lockout valve 202 to prevent access to the right float cylinder 170. The right float cylinder 170 is operatively coupled to a right float pressure transducer 204 that transforms pressure into an analog electrical signal.

The left float cylinder 166 and the right float cylinder 170 are each operable to move the left connecting arm 160 and the right connecting arm 62 respectively. In the example implementation described herein, the left float cylinder 166 and the right float cylinder 170 are each single acting hydraulic cylinders disposed in fluid communication with the hydraulic system. In other embodiments, the left float cylinder 166 and the right float cylinder 170 may include a double acting hydraulic cylinder, an air cushion or spring device, or some other device capable of moving the left connecting arm 160 and the right connecting arm 162 downward toward the ground surface. In the embodiment illustrated in FIGS. 5 and 6, the implement linkage system 142 is controlled in a float operating condition.

Returning to FIGS. 1 and 2, the agricultural machine 20 further includes an operator station 92, which houses control components of the agricultural machine 20. The control components may include, but are not limited to, an output 94 and an input 96. The output 94 is operable to convey a message to an operator. The input 96 is operable to receive instructions from the operator. In the example implementation described herein, the input 96 and the output 94 are combined and implemented as a touch screen display 99. Messages may be communicated to the operator through the display 99, and data may be entered by the operator by touching the display 99 as is understood by those skilled in the art. It should be appreciated that the input 96 and the output 94 may differ from the example implementation described herein and may be separate or combined components. For example, the output 94 may include, but is not limited to, a video only display, an audio speaker, a light board, etc. The input 96 may include, but is not limited to, a mouse, a keyboard, a microphone, etc.

Figure 8:
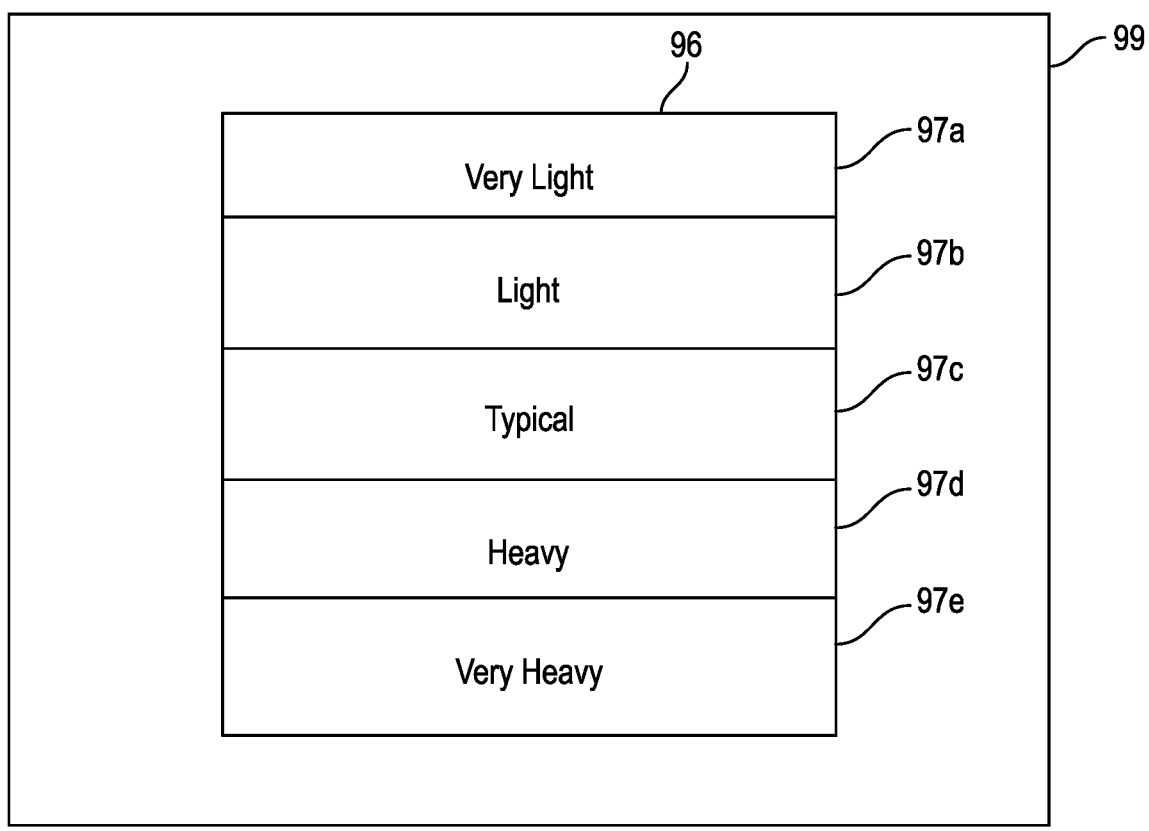
FIG. 8 is a schematic diagram of an exemplary user interface for the work implement of either FIG. 1 or FIG. 2.

One embodiment of the touch screen display 99 is illustrated in FIG. 8. The input 96 includes a plurality of predefined settings 97a-97e that are illustrated as a very light header down force 97a, a light header down force 97b, a typical header down force 97c, a heavy header down force 97d, and a very heavy header down force 97e and are displayed on the user interface or the touch screen display 99 from which the operator selects one of them as a designated or nominal setting. The operator can change the selected setting as desired. The plurality of predefined settings 97a-97e can include more or less settings as desired in other embodiments. Each of the plurality of settings 97a-97e corresponds to a desired left float pressure of the left float cylinders 66, 166 and a desired right float pressure of the right float cylinders 70, 170 as determined by the specific work implement 44 or 48 that is attached to the agricultural machine as described in more detail below. The desired left and right float pressures of the left and right float cylinders 66, 166, 70, 170, can be stored in a lookup table that is accessible by the controller 100 as described below. The desired left and right float pressures of the left and right float cylinders 66, 166, 70, 170, can include a specific float pressure for each. Alternatively, the desired left and right float pressures of the left and right float cylinders 66, 166, 70, 170, can include a range of float pressures for each. In any embodiment, the desired left and right float pressures of the left and right float cylinders 66, 166, 70, 170, are independent of each other. The rotary cutter 46 or the draper cutter 48 may not be symmetric about a center line of the agricultural machine 20 in terms of where the center of gravity is located. Therefore, it is beneficial to tailor or specify the left and right float pressures of the left and right float cylinders 66, 166, 70, 170 in an effort to obtain equal force on the ground that is applied by the rotary cutter 46 or the draper cutter 48 via the left and right float cylinders 66, 166, 70, 170.

In one exemplary embodiment, the predefined setting 97a is a very light header down force of the left float pressure of the left float cylinder 166 corresponds to 1500 psi with an acceptable tolerance band of ±25 psi. The predefined setting 97a is a very light header down force of the right float pressure of the right float cylinder 170 corresponds to 1400 psi with an acceptable tolerance band of ±25 psi. The predefined setting 97b is light header down force of the left float pressure of the left float cylinder 166 corresponds to 1300 psi with an acceptable tolerance band of ±25 psi. The predefined setting 97b is light header down force of the right float pressure of the right float cylinder 170 corresponds to 1200 psi with an acceptable tolerance band of ±25 psi. The predefined setting 97c is typical header down force of the left float pressure of the left float cylinder 166 corresponds to 1100 psi with an acceptable tolerance band of ±25 psi. The predefined setting 97c is typical header down force of the right float pressure of the right float cylinder 170 corresponds to 1000 psi with an acceptable tolerance band of ±25 psi. The predefined setting 97d is heavy header down force of the left float pressure of the left float cylinder 166 corresponds to 1000 psi with an acceptable tolerance band of ±25 psi. The predefined setting 97d is heavy header down force of the right float pressure of the right float cylinder 170 corresponds to 900 psi with an acceptable tolerance band of #25 psi. The predefined setting 97e is very heavy header down force of the left float pressure of the left float cylinder 166 corresponds to 800 psi with an acceptable tolerance band of ±25 psi. The predefined setting 97e is very heavy header down force of the right float pressure of the right float cylinder 170 corresponds to 700 psi with an acceptable tolerance band of ±25 psi.

The agricultural machine 20 may further include an attachment identifier 98. The attachment identifier 98 may be disposed in communication with a controller 100 and operable to identify the selected work implement 44 from other types of work implements. In one implementation, the attachment identifier 98 may be embodied as a Radio Frequency Identification (RFID) reader. The RFID reader may emit a signal and receive a response from a RFID tag attached to the selected work implement 44. The response from the RFID tag of the selected work implement 44 may include identification data that identifies the selected work implement 44. The identification data may include, but is not limited to, a make and model of the selected work implement 44, a year of manufacture, a weight of the selected work implement 44, etc. The RFID reader may then communicate the identification data to the controller 100 for use as described below.

In an alternative implementation, the attachment identifier 98 may be embodied as an image sensor combined with image recognition software. The image recognition software May be saved on the controller 100 and executable by the controller 100. Upon the selected work implement 44 being positioned near the forward end 30 of the frame 22, the image sensor May capture an image of the selected work implement 44 and communicate that image to the image recognition software. The image recognition software may analyze the image to identify the selected work implement 44 and obtain the identification data therefore, for example, from a database including the identification data for each of the plurality of different work implements. The features and operation of image recognition software are known to those skilled in the art and are therefore not described in greater detail herein.

Regarding FIGS. 3 and 4, the controller 100 is disposed in communication with the input 96, the output 94, the attachment identifier 98, the lift cylinder 54, the left float cylinder 66 and the right float cylinder 70. The controller 100 is operable to receive data entry from the input 96, send messages through the output 94, receive identification data from the attachment identifier 98, and control the operation of the lift cylinder 54, the left float cylinder 66 and the right float cylinder 70. Regarding FIGS. 5 and 6, the controller 100 is disposed in communication with the input 96, the output 94, the attachment identifier 98, the left float cylinder 166 and the right float cylinder 170.

While the controller 100 is generally described herein as a singular device, it should be appreciated that the controller 100 may include multiple devices linked together to share and/or communicate information therebetween. Furthermore, it should be appreciated that all or parts of the controller 100 may be located on the agricultural machine 20 or located remotely from the agricultural machine 20.

The controller 100 may alternatively be referred to as a computing device, a computer, a controller, a control unit, a control module, a module, etc. Regarding FIGS. 3 and 4, the controller 100 includes a processor 102, a memory 104, and all software, hardware, algorithms, connections, sensors, etc., necessary to manage and control the operation of the input 96, the output 94, the attachment identifier 98, the lift cylinder 54, the left float cylinder 66 and the right float cylinder 70. Regarding FIGS. 5 and 6, the controller 100 manages and controls the operation of the left float cylinder 166 and the right float cylinder 170 instead of the left float cylinder 66 and the right float cylinder 70 from FIGS. 3 and 4.

In any embodiment, a method may be embodied as a program or algorithm operable on the controller 100. It should be appreciated that the controller 100 may include any device capable of analyzing data from various sensors, comparing data, making decisions, and executing the required tasks.

As used herein, "controller" is intended to be used consistent with how the term is used by a person of skill in the art, and refers to a computing component with processing, memory, and communication capabilities, which is utilized to execute instructions (i.e., stored on the memory 104 or received via the communication capabilities) to control or communicate with one or more other components. In certain embodiments, the controller 100 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 100 may be in communication with other components on the agricultural machine 20, such as hydraulic components, electrical components, and operator inputs within the operator station 92. The controller 100 may be electrically connected to these other components by a wiring harness such that messages, commands, and electrical power may be transmitted between the controller 100 and the other components. Although the controller 100 is referenced in the singular, in alternative embodiments the configuration and functionality described herein can be split across multiple devices using techniques known to a person of ordinary skill in the art.

The controller 100 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices 96, 94, and communication interfaces, as well as signal conditioning and buffer electronics.

The computer-readable memory 104 may include any non-transitory/tangible medium which participates in providing data or computer-readable instructions. The memory 104 may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 100 includes the tangible, non-transitory memory 104 on which are recorded computer-executable instructions, including a float control algorithm 106. The processor 102 of the controller 100 is configured for executing the float control algorithm 106. The float control algorithm 106 implements a method of controlling the agricultural machine 20, described in detail below. When a new selected work implement 44 is positioned near the front 8 of the agricultural machine 20, and the agricultural machine 20 is equipped with the attachment identifier 98, the method includes soliciting instructions from the operator regarding a desired attachment identification technique for identifying the selected work implement 44. The step of requesting the desired attachment identification technique is generally indicated by box 220 in FIG. 7. The request or solicitation may be made using the output 94 displaying a message to the operator, requesting that the operator select the desired attachment identification technique. The possible attachment identification techniques may include, but are not limited to, an automatic technique using the attachment identifier 98, or a manual entry technique. If the agricultural machine 20 is not equipped with attachment identifier 98, then the controller 100 may proceed to request identification data related to the selected work implement 44 following the manual entry technique described below.

In response to the controller 100 requesting the desired attachment identification technique from the operator, the operator may respond by entering a selection into the input 96, thereby defining the desired attachment identification technique as one of the automatic technique, or the manual entry technique. The controller 100 may then proceed to identify the selected work implement 44 from the plurality of different work implements. The step of identifying the selected work implement is generally indicated by box 222 in FIG. 7.

When the operator selects the automatic technique, the controller 100 engages the attachment identifier 98 to identify the selected work implement 44. The attachment identifier 98 may be implemented in different manners. For example, if the attachment identifier 98 includes the RFID reader, the engaging the attachment identifier 98 may include emitting a signal from the RFID reader, and receiving a response signal from the RFID tag attached to the selected work implement 44. The response signal from the RFID tag may include the identification data that identifies the make, model, and/or properties of the selected work implement 44. If the selected work implement 44 does not include the RFID tag and the RFID reader fails to receive the response signal, then the controller 100 may proceed to identify the selected work implement 44 using the manual entry technique, described below.

Alternatively, if the attachment identifier 98 includes an image sensor and image recognition software, then the controller 100 may engage the image sensor to capture an image 6 of the selected work implement 44, and then proceed to use the image recognition software to analyze and identify the make, model, and/or properties of the selected work implement 44. If the image recognition software is unable to identify the selected work implement 44, then the controller 100 may proceed to identify the selected work implement 44 using the manual entry technique described below.

When the operator selects the manual entry technique the controller 100 may request the identification data related to the selected work implement 44 from the operator. The request or solicitation may be made using the output 94 displaying a message to the operator, requesting that the operator enter the requested identification data for the selected work implement 44. For example, the controller 100 may request that the operator enter a make and model of the controller 100. In other implementations, the controller 100 may request that the operator enter a width, length, and weight of the selected work implement 44. In response to the controller 100 requesting the identification data from the selected work implement 44 from the operator, the operator may respond by entering the identification data into the input 96.

Figure 7A:
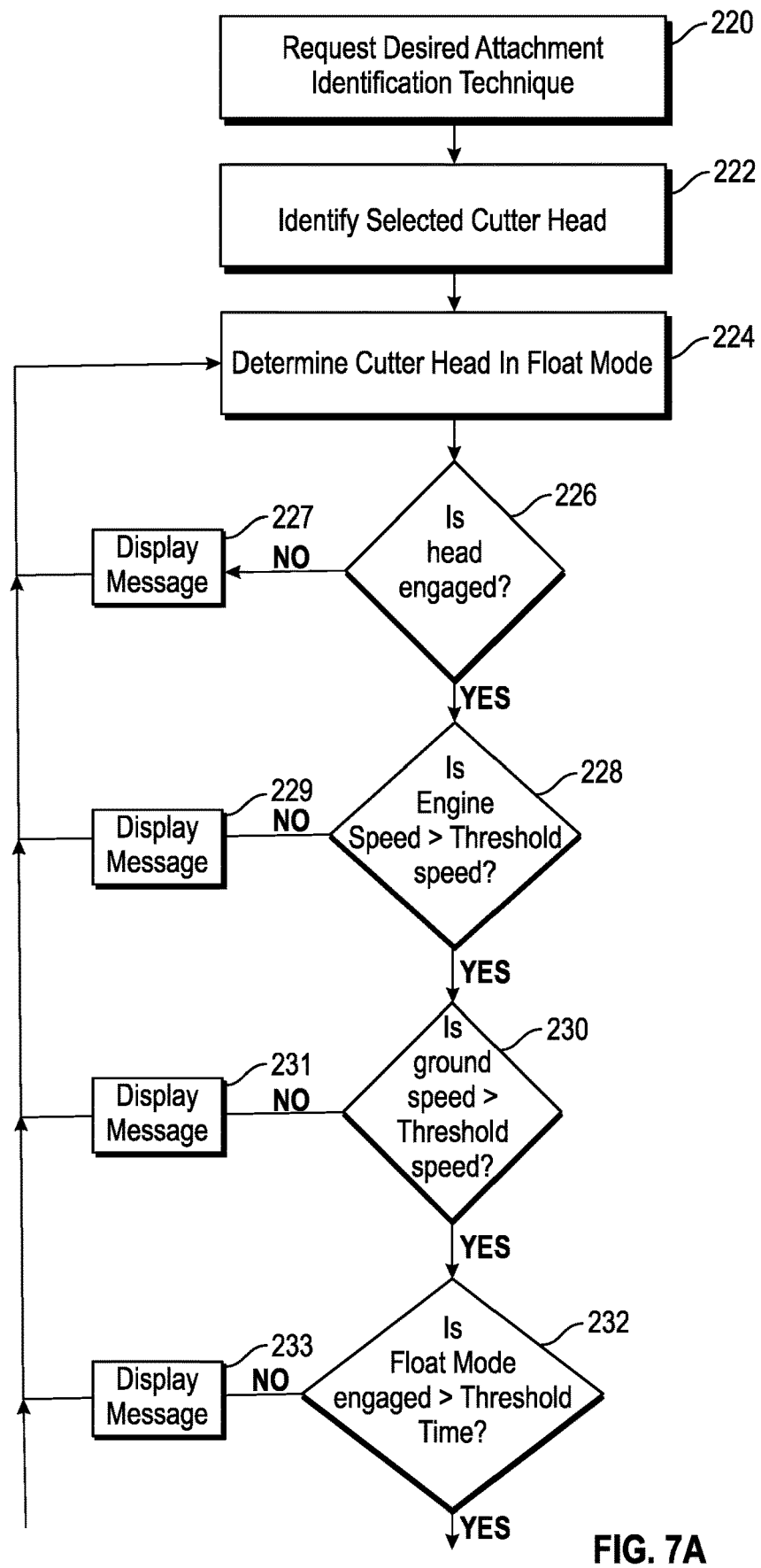
FIGS. 7a-7b is a flowchart representing a method of controlling the work implement of the agricultural machine of either FIG. 1 or FIG. 2.
Figure 7B:
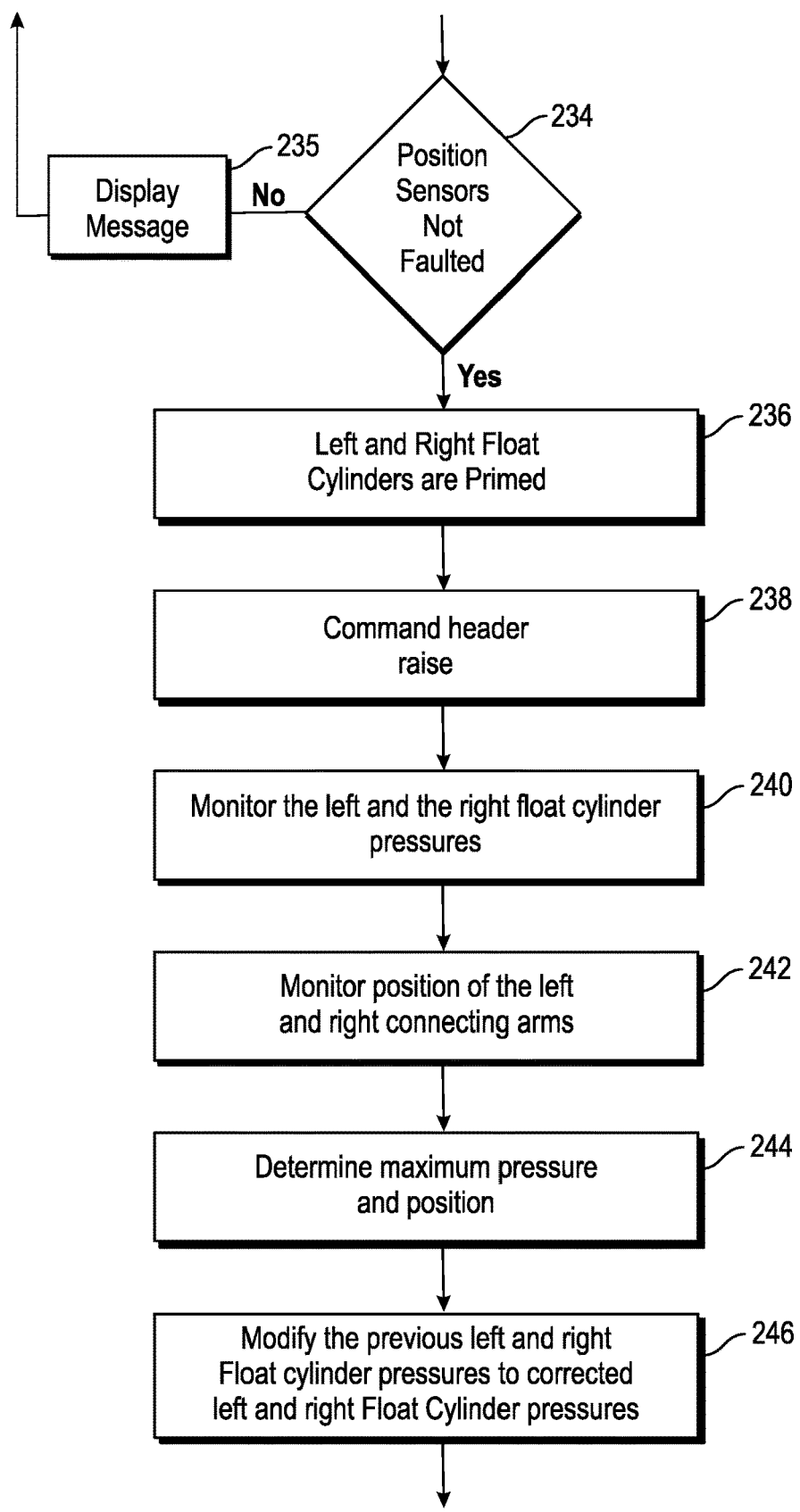
Figure 7C:
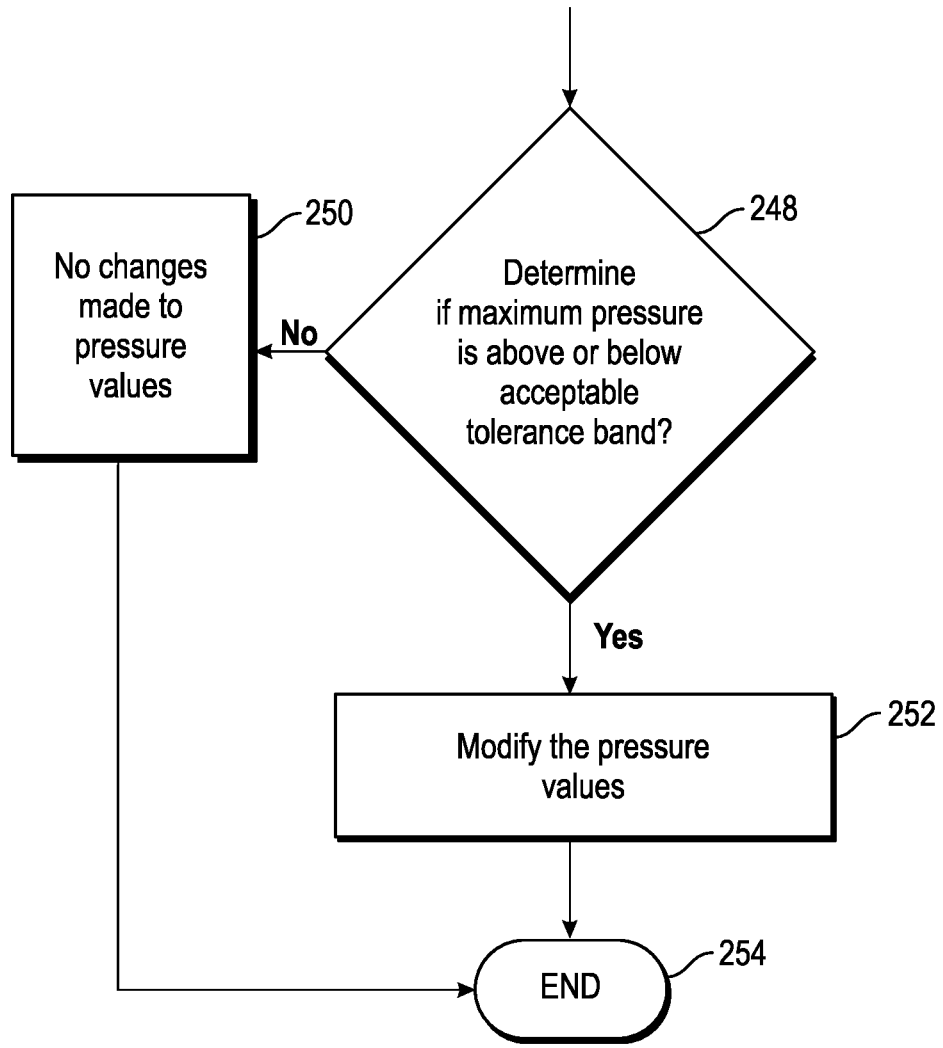

Once the controller 100 has identified the selected work implement 44, or otherwise obtained the identification data for the selected work implement 44, the controller 100 may then determine at box 224 whether the work implement 44 is in a float operating condition or some other operating condition in FIG. 7a.

The controller 100 determines if the work implement 44 is engaged at box 226. If the work implement 44 is not engaged then a message is displayed to the operator to engage the work implement 44 at box 227. If the work implement 44 is engaged then the controller 100 determines if the engine speed of the prime mover 24 is greater than a threshold speed or output (RPM) at box 228. If the engine speed of the prime mover 24 is not greater than the threshold speed or output, then a message is displayed to the operator to engage the prime mover 24 to increase the engine speed above the threshold speed or output at box 229. If the engine speed of the prime mover 24 is above the threshold speed or output, then the controller 100 determines if the ground speed of the work implement 44 or the right and left wheels 28 and 32 is greater than a threshold speed. If the ground speed of the work implement 44 or the right and left wheels 28 and 32 is less than the threshold speed, then a message is displayed to the operator to increase the speed of the work implement 44 and the right and left wheels 28 and 32 at box 231. If the ground speed of the work implement 44 or the right and left wheels 28 and 32 is greater than the threshold speed, then the controller 100 determines if a float mode of operation of the work implement 44 is engaged for greater than a threshold time in box 232.

In box 232, the controller 100 determines a float mode engagement if the following conditions are met for a period of time that is greater than a threshold period of time: the work implement 44 is engaged, the engine speed of the prime mover 24 is greater than the threshold 11 speed, and the ground speed of the work implement 44 or the right and left wheels 28 and 32 is greater than the threshold speed. If any of these conditions are not met or sustained for the period of time that is greater than the threshold period of time, then a message is displayed to the operator to continue operation of the work implement 44 being engaged, the engine speed of the prime mover 24 being greater than the threshold speed, and the ground speed of the work implement 44 or the right and left wheels 28 and 32 being greater than the threshold speed for a float mode period of time that meets or exceeds the threshold time period at box 233. If these conditions are met for the period of time that is greater than the threshold period of time, then the controller 100 determines if the position sensor 90 or the left and right cylinder position sensors 190 and 200 are not faulted in box 234. If any of the position sensors 90, 190, or 200 are faulted then a message is displayed to the operator to lower the appropriate one or more of left and right float cylinders 66, 70, or 166, 170 at box 235. If none of the position sensors 90, 190, or 200 are faulted then the controller 100 determines that the left and right float cylinders 66, 70 or 166, 170 are primed at box 236.

In box 238, the operator commands a header raise operation in which the work implement 44 is commanded to raise upwardly. In box 240, in one embodiment, after the work implement 44 has reached its commanded position then the controller 100 collects the pressure data of the left and right float cylinders 66, 70, or 166, 170 for the duration of the work implement 44 being in this commanded position. In this embodiment, the controller 100 collects the pressure data statically after the work implement 44 has reached its commanded position. In box 240, in another embodiment, while the work implement 44 is moving to its commanded position the controller 100 collects the pressure data of the left and right float cylinders 66, 70, or 166, 170 for the duration of the work implement 44 moving into this commanded position. In this embodiment, the controller 100 collects the pressure data dynamically.

Concurrently with box 240, in box 242, the controller 100 is monitoring and determining a position of each of the left and right connecting arms 60, 62 or 160, 162. Concurrently with box 240, in box 244 the controller 100 is monitoring and determining a maximum pressure and a position that this maximum pressure occurred for each of the left and right float cylinders 66, 70, or 166, 170.

In box 246, the controller 100 modifies or adjusts the maximum pressure to reflect a pressure at a standard position due to any lift geometry variation through a lift range of the work implement 44. In box 248, the controller 100 determines if the maximum pressure is above or below the acceptable tolerance band for each of the plurality of predefined settings 97a-97e. If the maximum pressure is within the acceptable tolerance band for any of the float pressure values of plurality of predefined settings 97a-97e, then no changes are made to those particular float pressure values for settings 97a-97e and the float control algorithm 106 ends at box 250. If the maximum pressure is below or above the acceptable tolerance band for any of the float 17 pressure values of the plurality of predefined settings 97a-97e, then changes or adjustments are made to those particular float pressure values of the plurality of predefined settings 97a-97e to create a corresponding set or plurality of corrected pressure values associated with the plurality of predefined settings 97a-97e at box 252. The controller 100 determines the plurality of corrected pressure values by averaging corresponding prior float pressure values of the predefined settings 97a-97e with the maximum pressure for each of the left and right float cylinders 66, 70, or 166, 170 as determined in box 246 to establish a plurality of corrected pressure s required to raise the work implement 44 at each of the predefined settings 97a-97e. Any previous values of the plurality of corrected pressures required to raise the work implement 44 are discarded by the controller 100. The float pressure required to raise the work implement 44 is used to correct or adjust the float pressure values of the plurality of predefined settings 97a-97e in FIG. 8 of each the left and right float cylinders 66, 70, or 166, 170. Alternatively, the float pressure required to hold the raised head or work implement 44 can be used to correct or adjust the float pressure values of the plurality of predefined settings 97a-97e in FIG. 8 of each the left and right float cylinders 66, 70, or 166, 170. The float control algorithm 106 ends at box 254.

The present disclosure provides a stable or consistent performance as operation of the work implement 44 changes due to factors such as wear, corrosion, dirt or debris accumulation, or customer modification of the work implement 44. The present disclosure minimizes the need for an operator to make manual adjustments to the float settings of each the left and right float cylinders 66, 70, or 166, 170 as the present disclosure can automatically adjust the float settings to account for these factors in an effort to obtain equal force on the ground that is applied by the rotary cutter 46 or the draper cutter 48 via the left and right float cylinders 66, 70, or 166, 170. The present disclosure identifies variances from an acceptable tolerance band that will influence the target float pressure and then adjusts the target float pressure of the left and right float cylinders 66, 70, or 166, 170 to provide for consistent performance of the work implement 44.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. An agricultural machine comprising:
    a frame;
    an implement linkage system attached to the frame and configured for attaching a selected work implement from a plurality of different work implements to the frame, wherein the implement linkage system includes a left connecting arm and a right connecting arm;
    a left float cylinder attached to and interconnected with the frame and the left connecting arm;
    a right float cylinder attached to and interconnected with the frame and the right connecting arm;
    wherein the implement linkage system is controllable in a float operating condition allowing the selected work implement to vertically track a ground surface during horizontal movement over the ground surface;
    an output operable to convey a message to an operator;
    an input operable to receive instructions from the operator;
    a controller including a processor and a memory having a float control algorithm stored thereon, wherein the processor is operable to execute the float control algorithm to:
        identify the selected work implement from the plurality of different work implements;
        solicit a desired operating condition from a plurality of predefined settings from the operator via the input, wherein the desired operating condition corresponds to a designated pressure setting of the left and right float cylinders in a database;
        operate the work implement in a float mode of operation;
        command the work implement to a raised position;
        automatically determine a maximum pressure and a position that the maximum pressure corresponds to for each of the left and right float cylinders; and
        automatically modify the designated pressure setting of the left and right float cylinders in the database based on the maximum pressure and position for each of the left and right float cylinders.

2. The agricultural machine of claim 1, wherein the processor is operable to execute the float control algorithm to automatically determine if the maximum pressure is within an acceptable tolerance for each of the left and right float cylinders.

3. The agricultural machine of claim 2, wherein when the maximum pressure is within the acceptable tolerance for each of the left and right float cylinders then the designated pressure setting of the left and right float cylinders in the database is not changed.

4. The agricultural machine of claim 2, wherein when the maximum pressure is within the acceptable tolerance for one of the left and right float cylinders then the designated pressure setting of that one of left and right float cylinders in the database is not changed, and wherein when the maximum pressure is not within the acceptable tolerance for the other of the left and right float cylinders then the designated pressure setting of the other of the left and right float cylinders in the database is modified.

5. The agricultural machine of claim 4, wherein modification of the designated pressure setting in the database includes averaging corresponding pressure values of the predefined settings with the maximum pressure for the other of the left and right float cylinders to determine a plurality of corrected required to raise the work implement.

6. The agricultural machine of claim 4, wherein the processor is operable to execute the float control algorithm to automatically replace the designated pressure settings of the other of left and right float cylinders with the plurality of corrected pressures required to raise the work implement in the database.

7. The agricultural machine of claim 2, wherein when the maximum pressure is not within the acceptable tolerance for the left and right float cylinders then the designated pressure setting of the left and right float cylinders in the database is modified.

8. The agricultural machine of claim 7, wherein modification of the designated pressure setting in the database includes averaging corresponding pressure values of the predefined settings with the maximum pressure for the left and right float cylinders to determine a plurality of corrected pressures required to raise the work implement.

9. The agricultural machine of claim 8, wherein the processor is operable to execute the float control algorithm to automatically replace the designated pressure settings of the left and right float cylinders with the plurality of corrected pressure s required to raise the work implement in the database.

10. The agricultural machine of claim 2, wherein the automatically determine a maximum pressure and a position that the maximum pressure corresponds to for each of the left and right float cylinders occurs while the work implement is moving to the raised position.

11. The agricultural machine of claim 2, wherein the automatically determine a maximum pressure and a position that the maximum pressure corresponds to for each of the left and right float cylinders occurs after the work implement has moved to the raised position.

12. A method of controlling an agricultural machine, the method comprising:
providing an agricultural machine having a frame, an implement linkage system attached to the frame and configured for attaching a selected work implement from a plurality of different work implements to the frame, wherein the implement linkage system includes a left connecting arm and a right connecting arm, a left float cylinder attached to and interconnected with the frame and the left connecting arm, a right float cylinder attached to and interconnected with the frame and the right connecting arm, wherein the implement linkage system is controllable in a float operating condition allowing the selected work implement to vertically track a ground surface during horizontal movement over the ground surface, a controller including a processor and a memory having a float control algorithm stored thereon;
identifying via the controller the selected work implement from the plurality of different work implements;
soliciting a desired operating condition from a plurality of predefined settings from the operator via an input operable to receive instructions from the operator, wherein the desired operating condition corresponds to a designated pressure setting of the left and right float cylinders in a database;
operating the work implement in a float mode of operation;
commanding the work implement to a raised position;
automatically determining via the controller a maximum pressure and a position that the maximum pressure corresponds to for each of the left and right float cylinders; and
automatically modifying, via the controller, the designated pressure setting of the left and right float cylinders in the database based on the maximum pressure and position for each of the left and right float cylinders.

13. The method of claim 12, further comprising:
automatically determining if the maximum pressure is within an acceptable tolerance for each of the left and right float cylinders, wherein when the maximum pressure is within the acceptable tolerance for any of the left and right float cylinders then the designated pressure setting of the corresponding float cylinder in the database is not changed, and wherein when the maximum pressure is not within the acceptable tolerance for any of the left and right float cylinders then the designated pressure setting of the corresponding right float cylinder in the database is modified.

14. The method of claim 12, wherein modifying the designated pressure setting in the database includes averaging corresponding pressure values of the predefined settings with the maximum pressure for the left and right float cylinders to determine a plurality of corrected pressures required to raise the work implement.

15. The method of claim 14, further comprising: automatically replacing the designated pressure settings of the left and right float cylinders with the plurality of corrected pressures required to raise the work implement in the database.

16. The method of claim 12, wherein when the maximum pressure is not within the acceptable tolerance for the left and right float cylinders then the designated pressure setting of the left and right float cylinders in the database is modified.

17. The method of claim 16, wherein modifying the designated pressure setting in the database includes averaging corresponding pressure values of the predefined settings with the maximum pressure for the left and right float cylinders to determine a plurality of corrected required to raise the work implement.

18. The method of claim 17, further comprising:
automatically replacing the designated pressure settings of the left and right float cylinders with the plurality of corrected pressures required to raise the work implement in the database.

19. The method of claim 12, wherein the automatically determining a maximum pressure and a position that the maximum pressure corresponds to for each of the left and right float cylinders occurs while the work implement is moving to the raised position.

20. The method of claim 12, wherein the automatically determining a maximum pressure and a position that the maximum pressure corresponds to for each of the left and right float cylinders occurs after the work implement has moved to the raised position.

* * * * *